US010808752B2

(12) United States Patent
Itadani

(10) Patent No.: US 10,808,752 B2
(45) Date of Patent: Oct. 20, 2020

(54) SLIDING MEMBERS

(71) Applicant: EAGLE INDUSTRY CO., LTD., Minato-Ku, Tokyo (JP)

(72) Inventor: Masatoshi Itadani, Tokyo (JP)

(73) Assignee: EAGLE INDUSTRY CO., LTD, Tokyo (JP)

( * ) Notice: Subject to any disclaimer, the term of this patent is extended or adjusted under 35 U.S.C. 154(b) by 0 days.

(21) Appl. No.: 16/347,996

(22) PCT Filed: Nov. 16, 2017

(86) PCT No.: PCT/JP2017/041212
§ 371 (c)(1),
(2) Date: May 7, 2019

(87) PCT Pub. No.: WO2018/092829
PCT Pub. Date: May 24, 2018

(65) Prior Publication Data
US 2019/0264737 A1    Aug. 29, 2019

(30) Foreign Application Priority Data
Nov. 18, 2016  (JP) .................................. 2016-225069

(51) Int. Cl.
*F16C 17/12*    (2006.01)
*F16J 15/34*    (2006.01)
(Continued)

(52) U.S. Cl.
CPC ............ *F16C 17/12* (2013.01); *F16C 33/103* (2013.01); *F16C 33/741* (2013.01); *F16J 15/34* (2013.01);
(Continued)

(58) Field of Classification Search
CPC ...... F16C 17/045; F16C 17/12; F16C 33/103; F16C 33/1065; F16C 33/1085;
(Continued)

(56) References Cited

U.S. PATENT DOCUMENTS 3,744,805 A       7/1973   Heinrich
5,441,283 A  *    8/1995   Pecht .................. F16J 15/3412
                                                            277/400
(Continued)

FOREIGN PATENT DOCUMENTS

EP    1207314 A2 *  5/2002  ............ F16C 33/107
EP    3009542 A1 *  4/2016  ............. D01H 7/602
(Continued)

OTHER PUBLICATIONS

International Search Report (ISR) dated Feb. 6, 2018, issued for International application No. PCT/JP2017/041212. (1 page).

*Primary Examiner* — Marcus Charles
(74) *Attorney, Agent, or Firm* — Law Office of Katsuhiro Arai

(57) ABSTRACT

In an exemplary embodiment, a sliding member includes sliding faces S configured to slide in relation to one another, at least one sliding face 5 of the sliding faces being provided with a plurality of dimples 11 having multi-sided shapes whose edges are formed without interruption. A pair of the edges A1-B1, A1-C1 of each of the multi-sided dimples 11, extending radially on opposite sides of a radial axis R of the sliding member, are sloped to become farther apart as they extend toward a high-pressure fluid side, and an edge B1-C1, which connects end points B1, C1 on the high-pressure fluid side of the pair of the edges, is formed such that its length is not greater than the lengths of the pair of the edges A1-B1, A1-C1. The sliding member can reduce fric- (Continued)

tion between the sliding faces and improve sealing performance regardless of the direction of rotation.

20 Claims, 12 Drawing Sheets

(51) Int. Cl.
*F16C 33/10* (2006.01)
*F16C 33/74* (2006.01)
(52) U.S. Cl.
CPC ....... *F16J 15/3412* (2013.01); *F16C 2240/44* (2013.01)
(58) Field of Classification Search
CPC .............. F16C 33/741; F16C 2240/44; F16C 2240/70; F16J 15/34; F16J 15/3416; F16J 15/3412; F16J 15/3424; F05D 2240/50
USPC ................ 384/118, 123, 276, 286, 291, 293
See application file for complete search history.

(56) References Cited

U.S. PATENT DOCUMENTS

| | | | | |
|---|---|---|---|---|
| 5,492,341 | A * | 2/1996 | Pecht | F16J 15/3412 |
| | | | | 277/400 |
| 6,511,226 | B2 * | 1/2003 | Thompson | F16C 33/1075 |
| | | | | 384/420 |
| 6,523,456 | B1 * | 2/2003 | Kobayashi | F02F 3/00 |
| | | | | 92/158 |
| 7,744,094 | B2 * | 6/2010 | Yanagisawa | F16J 15/342 |
| | | | | 277/399 |
| 9,188,159 | B2 * | 11/2015 | Tanaka | F16C 33/046 |
| 9,297,418 | B2 * | 3/2016 | Suzuki | C08L 77/02 |
| 9,829,043 | B2 * | 11/2017 | Inoue | F16C 33/107 |
| 2011/0215531 | A1 * | 9/2011 | Tokunaga | F16J 15/34 |
| | | | | 277/399 |
| 2011/0233872 | A1 * | 9/2011 | Iguchi | F16J 15/3424 |
| | | | | 277/400 |
| 2012/0183246 | A1 * | 7/2012 | Oki | F16C 23/046 |
| | | | | 384/286 |
| 2013/0234400 | A1 * | 9/2013 | Iijima | F16J 9/12 |
| | | | | 277/459 |
| 2014/0170377 | A1 * | 6/2014 | Hsu | F02F 1/20 |
| | | | | 428/141 |
| 2014/0197600 | A1 * | 7/2014 | Hosoe | F16J 15/3412 |
| | | | | 277/409 |
| 2015/0226336 | A1 | 8/2015 | Kirchner | |
| 2016/0195139 | A1 * | 7/2016 | Inoue | F16C 33/74 |
| | | | | 384/286 |
| 2016/0252182 | A1 * | 9/2016 | Itadani | F04D 29/10 |
| | | | | 277/401 |
| 2018/0017163 | A1 * | 1/2018 | Hosoe | F16J 15/34 |
| 2018/0058502 | A1 * | 3/2018 | Hosoe | B23K 26/355 |

FOREIGN PATENT DOCUMENTS

| | | | | |
|---|---|---|---|---|
| EP | 3270016 | A1 * | 1/2018 | .......... F16J 15/3424 |
| JP | H0560247 | A | 3/1993 | |
| JP | H09133222 | A | 5/1997 | |
| JP | 2013137080 | A * | 7/2013 | |
| WO | WO-2016129553 | A1 * | 8/2016 | .............. F16J 15/34 |
| WO | 2016143721 | A1 | 9/2016 | |

* cited by examiner (a)

HIGH-PRESSURE FLUID SIDE

LOW-PRESSURE FLUID SIDE (b)

3B-3B CROSS SECTION (a)

(b)

(a)

(b)

(a)

(b)

(a)

(b)

SLIDING MEMBERS

CROSS-REFERENCE TO RELATED APPLICATIONS

This application is the U.S. National Phase under 35 U.S.C. § 371 of International Application PCT/JP2017/041212, filed Nov. 16, 2017, which claims priority to Japanese Patent Application No. 2016-225069, filed Nov. 18, 2016. The International Application was published under PCT Article 21(2) in a language other than English.

TECHNICAL FIELD

The present invention relates to sliding members suitable, for example, as mechanical seals, bearings, and other sliding units. More particularly, the present invention relates to sliding members for seal rings, bearings, or the like that require a reduction of friction by interposing fluid between sliding faces, and prevention of leakage of the fluid from the sliding faces.

BACKGROUND ART

A mechanical seal, an example of a sliding member, must satisfy the conflicting requirements of "sealing" and "lubrication" in order to maintain sealing performance over the long term. In particular, in recent years, environmental protection policies and the like have strengthened the demand for reducing friction, so as to decrease mechanical loss while also preventing the leakage of sealed fluids. Friction can be reduced by a technique that creates a state of hydrodynamic lubrication, in which rotation creates dynamic pressure between sliding faces and the faces slide in a state in which a liquid film is interposed between them.

For example, the creating of a state of hydrodynamic lubrication is disclosed in the first embodiment of Patent Document 1. A sealing face of a rotating sealing ring of a mechanical seal is provided with a plurality of fluid introducing grooves and a plurality of dynamic pressure generating grooves. Each of the fluid introducing grooves is open to a radially outer side (a high-pressure side Y) at its outer end and is closed inside the sealing face at its inner end. Each of the dynamic pressure generating grooves is continuous with the corresponding one of the fluid introducing grooves and extends counterclockwise in the circumferential direction from the fluid introducing groove. Rotating the rotating sealing ring clockwise causes a fluid on the high-pressure side Y to flow through the fluid introducing grooves into the dynamic pressure generating grooves, thus generating dynamic pressure between the sealing face of the rotating sealing ring and the sealing face of a stationary sealing ring, thereby creating the state of hydrodynamic lubrication.

A configuration is disclosed in the second embodiment of Patent Document 1 in which the dynamic pressure generating grooves are disposed such that they are continuous with opposite sides of the corresponding fluid introducing grooves, such that the state of hydrodynamic lubrication is created not only when the rotating sealing ring rotates clockwise, but also when it rotates counterclockwise.

Furthermore, a configuration is disclosed in Patent Document 2 in which the state of hydrodynamic lubrication is created by forming a plurality of circular dimples or elliptical dimples in a regular pattern on a sliding face of a stationary ring of a mechanical seal.

CITATION LIST

Patent Documents

Patent Document 1: JP 5-60247 A (pages 2, 3; FIGS. 2, 4)
Patent Document 2: JP 9-133222 A (page 4; FIGS. 1, 2)

SUMMARY OF THE INVENTION

Problem to be Solved by the Invention

However, in the first embodiment of Patent Document 1, because each of the dynamic pressure generating grooves extends in the circumferential direction from only one side of the corresponding fluid introducing groove, if the rotating sealing ring is not rotated in the clockwise direction, that is, if it is not rotated in the direction that positions the fluid introducing groove on the upstream side of the dynamic pressure generating grooves, positive dynamic pressure cannot be generated by the dynamic pressure generating grooves, and the state of hydrodynamic lubrication cannot be created. Furthermore, even if the rotating sealing ring is rotated in the direction that generates positive dynamic pressure, the pressurized fluid is supplied to the sliding face from the dynamic pressure generating grooves, which extend in the circumferential direction. The portion of the fluid that is supplied to the low-pressure fluid side of the sliding face leaks out almost completely, creating a problem by impairing the sealing performance.

Furthermore, in the second embodiment of Patent Document 1, the providing of the dynamic pressure generating grooves on opposite sides of the fluid introducing grooves means that positive dynamic pressure can be generated regardless of whether the rotating sealing ring is rotated in the forward or the rearward direction. However, in this case, a flow of fluid into the fluid introducing groove from the dynamic pressure generating groove on the upstream side and a flow of fluid into the fluid introducing groove from the opening on the radially outer side are both generated. Therefore, the fluid that flows into the fluid introducing groove from the dynamic pressure generating groove on the upstream side collides with the fluid that flows into the fluid introducing groove from the opening on the radially outer side. This makes it impossible for the fluid to be directed efficiently into the dynamic pressure generating groove on the downstream side, so the state of hydrodynamic lubrication cannot be created as well as it can when the dynamic pressure generating grooves are provided extending only from one side of the fluid introducing grooves, as in the first embodiment. Moreover, in the same manner as in the first embodiment, the pressurized fluid that is supplied from the dynamic pressure generating grooves to the low-pressure fluid side of the sliding face leaks out almost completely, creating the problem of impaired sealing performance.

In Patent Document 2, the state of hydrodynamic lubrication can be created regardless of the direction of rotation, but within the circular and elliptical dimples, positive and negative pressures are generated nearly symmetrically, so sufficient positive dynamic pressure cannot be generated for each dimple as a whole, and a sufficient state of hydrodynamic lubrication cannot be created.

It is an object of the present invention to provide a sliding member that reduces friction regardless of the direction of rotation by interposing a fluid between sliding faces and that improves sealing performance regardless of the direction of rotation.

Means for Solving Problem

To solve the problems described above, a sliding member of the present invention is characterized by having sliding faces configured to slide in relation to one another, with at least one of the sliding faces being provided with a plurality of dimples having multi-sided shapes whose edges are formed without interruption.

A pair of the edges of each of the multi-sided dimples, extending in the radial direction on opposite sides of a radial axis of the sliding member, become farther apart as they extend toward a high-pressure fluid side of the sliding member, and another of the edges, which connects the end points on the high-pressure fluid side of the pair of the edges, is formed such that its length is not greater than the lengths of the pair of the edges.

According to this aspect, of the two edges that extend in the radial direction on opposite sides of the radial axis of the sliding member, one is the edge on an upstream side of the dimple, and the other is the edge on a downstream side. The pressure of a fluid that flows into the dimple from the edge on the upstream side becomes negative, and when the fluid is blocked by the edge on the downstream side, its pressure increases to become positive. The pressurized fluid is pumped toward the high-pressure fluid side along the edge on the downstream side, which becomes farther away from the edge on the upstream side as it extends toward the high-pressure fluid side, and the volume of the fluid increases as the fluid stream successively merges with other pressurized streams that are pumped toward the high-pressure fluid side. The range of the positive pressure fluid can therefore be enlarged from the downstream side of the dimple toward the upstream side. Furthermore, because the length of the edge that connects the end points on the high-pressure fluid side of the pair of the edges is not greater than the lengths of the pair of the edges, the outlet side for the pressurized fluid becomes narrower. Therefore, the positive pressure region within the dimple becomes sufficiently greater than the negative pressure region, so that sufficient positive pressure can be generated for the dimple as a whole, regardless of the direction of rotation, and a state of sufficient hydrodynamic lubrication can be achieved. In addition, the high-pressure fluid that is supplied from the dimple to the sliding face moves toward the radially outward side as it subsequently flows into the adjacent dimple in the circumferential direction and the adjacent dimple on the radially outward side. Therefore, the flow toward a low-pressure fluid side can be reduced, and the sealing performance can be improved, regardless of the direction of rotation.

The sliding member of the present invention may also be characterized by including a bottom portion in each of the plurality of the dimples, with the bottom portions having equal depths.

According to this aspect, dimples providing both lubrication performance and sealing performance can be formed easily.

The sliding member of the present invention may also be characterized by including a bottom portion in each of the plurality of the dimples, with the bottom portions having different depths.

According to this aspect, the arrangement of the plurality of the dimples can be optimized for the sliding speed and the temperature (the viscosity of the fluid), so good lubrication performance and sealing performance can be achieved.

The sliding member of the present invention may also be characterized by providing the plurality of the dimples in different sizes.

According to this aspect, the arrangement of the plurality of the dimples can be optimized for the sliding speed and the temperature (the viscosity of the fluid), so good lubrication performance and sealing performance can be achieved.

The sliding member of the present invention may also be characterized by providing the bottom portion of each of the dimples such that it slopes downward toward the radial axis from vicinities of the pair of the edges.

According to this aspect, a sudden pressure drop on the upstream side of the dimple can be mitigated, and the pressure on the downstream side of the dimple can be increased efficiently.

The sliding member of the present invention may also be characterized by providing the bottom portion of each of the dimples such that it slopes upward from the low-pressure fluid side toward the high-pressure fluid side.

According to this aspect, the pressure of the fluid becomes negative as the fluid flows into the dimple from the upstream side and becomes positive as the flow is blocked by the edge on the downstream side. The pressure is increased even more by the flowing of the fluid over the bottom portion, which slopes upward from the low-pressure fluid side toward the high-pressure fluid side. Therefore, the high-pressure fluid region is even further enlarged from the downstream side of the dimple toward the upstream side, so that the positive pressure region within the dimple can be made sufficiently larger than the negative pressure region, regardless of the direction of rotation.

The sliding member of the present invention may also be characterized by providing the bottom portion of each of the dimples such that it includes a continuous groove configured to be continuous between the vicinities of the pair of the edges.

According to this aspect, the high-pressure fluid can be supplied through the continuous groove in the bottom portion of the dimple from the positive pressure region on the downstream side of the dimple to the negative pressure region on the upstream side, so the negative pressure region within the dimple can be reduced, and sufficient positive pressure can be generated for the dimple as a whole.

The sliding member of the present invention may also be characterized by providing each of the dimples with a shape that is symmetrical in relation to the radial axis.

According to this aspect, the dimple has good lubrication performance and sealing performance, regardless of the direction of rotation.

The sliding member of the present invention may also be characterized by providing each of the dimples as a three-sided shape.

According to this aspect, the dimple can be formed easily, because it has a simple shape.

The sliding member of the present invention may also be characterized by providing the plurality of the dimples in a plurality of rows that are arrayed in the radial direction, with each of the rows forming a ring with a specified diameter.

According to this aspect, dimples having good lubrication performance and sealing performance, regardless of the direction of rotation, are disposed uniformly over the entire sliding face, making it possible to reduce friction and leakage.

The sliding member of the present invention may also be characterized by providing the dimples in rows that are adjacent to one another in the radial direction such that they are offset from one another in the circumferential direction.

According to this aspect, the disposing of the dimples in rows that are adjacent to one another in the radial direction such that they are offset from one another in the circumferential direction makes it possible to reduce friction further.

The sliding member of the present invention may also be characterized by providing the plurality of the dimples such that they are disposed randomly.

According to this aspect, arranging the dimples randomly makes it possible to demonstrate good lubrication performance and sealing performance in accordance with the sliding speed and the temperature.

DESCRIPTION OF EMBODIMENTS

Hereinafter, with reference to the drawings, a mode for carrying out this invention will be described illustratively based on embodiments. However, the dimensions, materials, shapes, relative arrangements, and the like of a sliding member described in the embodiments are not intended to limit the scope of the present invention only to them unless otherwise described explicitly.

First Embodiment

Figure 1:
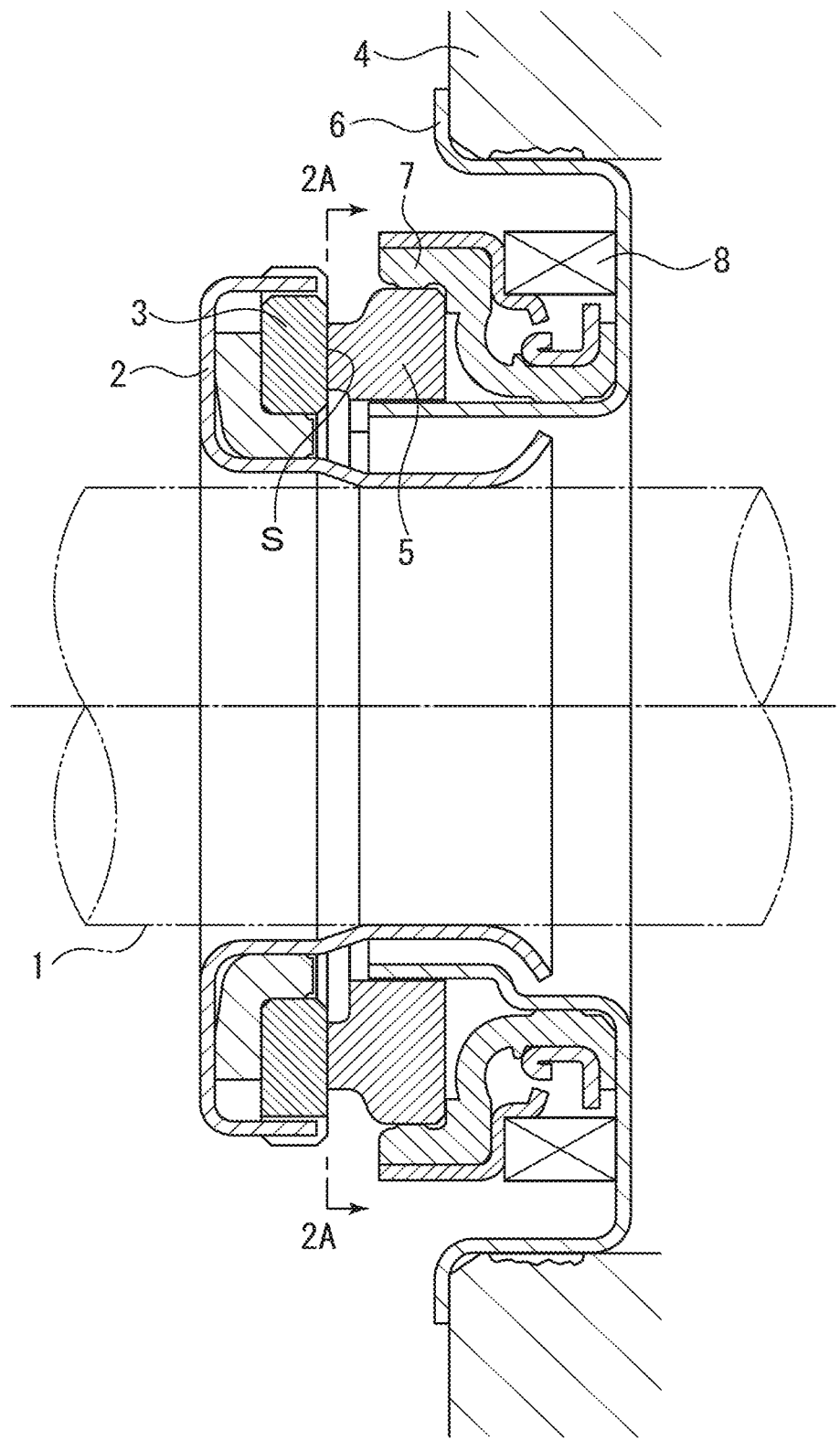
FIG. 1 is a vertical cross-sectional view showing an example of a mechanical seal in which a sliding member according to a first embodiment of the present invention is used.

In a first embodiment, a case will be explained, as an example, in which a sliding member according to the present invention is a sliding member that configures a mechanical seal. FIG. 1 is a vertical cross-sectional view showing an example of the mechanical seal, which is an inside mechanical seal that seals off a sealed fluid on a high-pressure fluid side that would otherwise leak from an outer circumference of a sliding face toward an inner circumference. The mechanical seal includes an annular rotating ring 3, which is provided in a state in which it can rotate integrally with a rotating shaft 1, through a sleeve 2 that is interposed between the rotating ring 3 and the rotating shaft 1. The mechanical seal also includes an annular stationary ring 5, which is provided in a state in which it does not rotate and can move in an axial direction, with a stationary side sleeve 6 interposed between the stationary ring 5 and a housing 4 of a pump. A coiled wave spring 8 and a bellows 7 that bias the stationary ring 5 in the axial direction cause sliding faces S of the rotating ring 3 and the stationary ring 5 to slide in tight contact with one another. The sliding faces S are provided with mirror finishes by lapping or the like. In other words, where the sliding faces S of the rotating ring 3 and the stationary ring 5 are in contact with one another, the mechanical seal prevents the sealed fluid from flowing from the outer circumferential side of the rotating shaft 1 to the outside.

Figure 2:
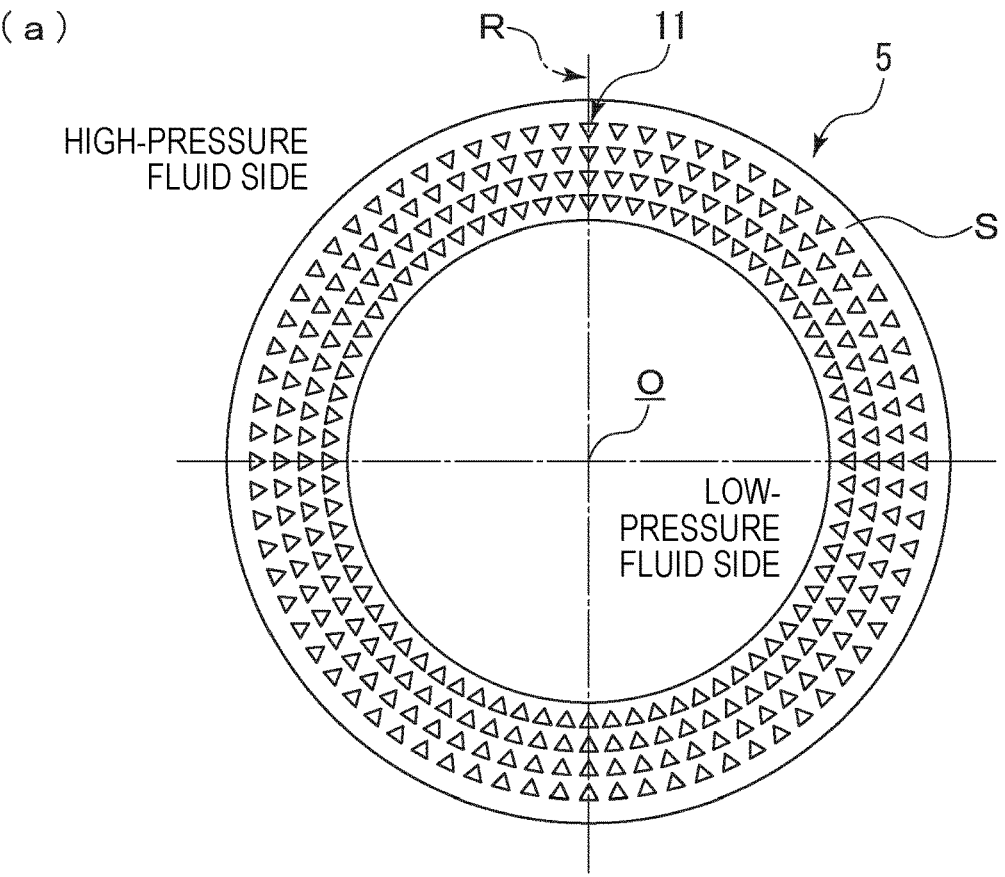
FIG. 2A is a figure of a sliding face, as seen along arrows 2A-2A in FIG. 1, showing a sliding face on which a plurality of dimples are arrayed, with the radially outer side of the sliding member being a high-pressure fluid side and the radially inner side of the sliding member being a low-pressure fluid side.
FIG. 2B is a figure of the sliding face and is an enlarged view of one of the dimples.
Figure 2:
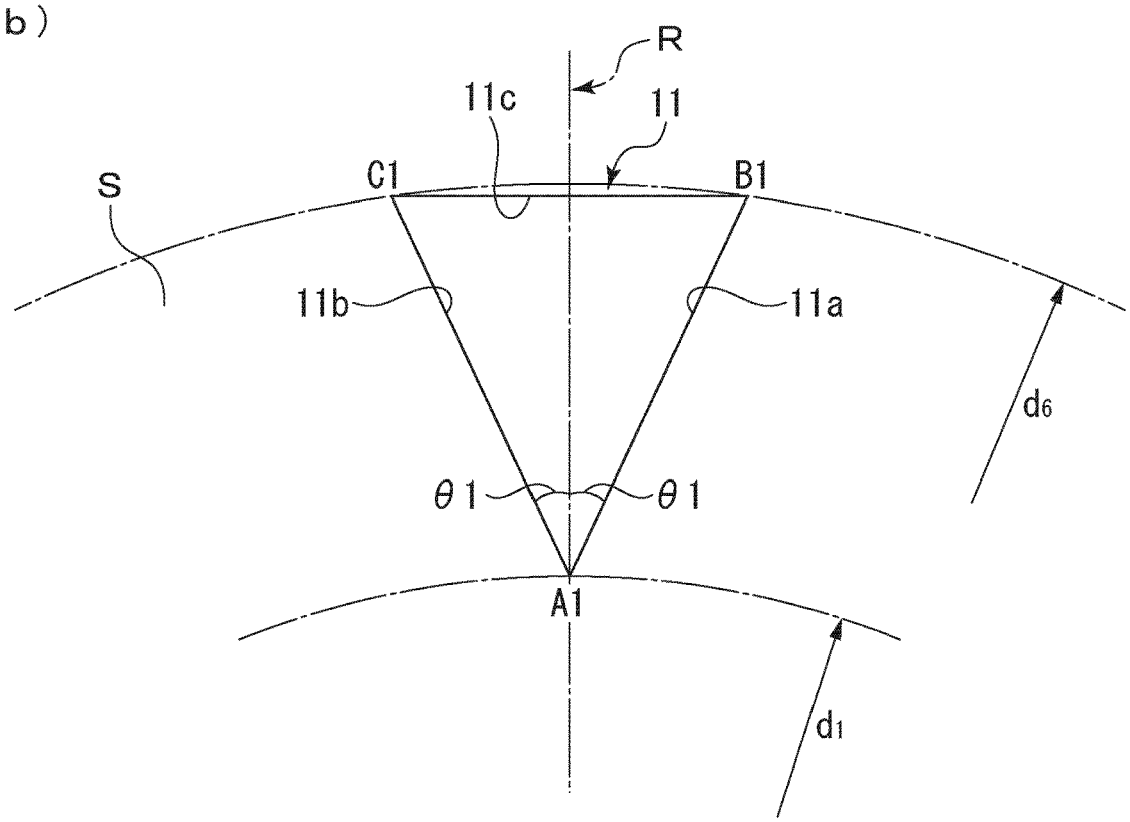

FIG. 2 is an explanatory figure showing a case in which a plurality of dimples 11 are formed in the sliding face S of the stationary ring 5, as seen along arrows W-W in FIG. 1. As shown in FIG. 2, the plurality of the dimples 11 are disposed such that a group of the dimples 11 arranged at equal intervals on a circumference with a specified diameter are provided in a plurality of rows that are arrayed in the radial direction (four rows in FIG. 2). Each of the dimples 11 is formed in a triangular shape whose edges A1-B1, A1-C1, and B1-C1 are uninterruptedly surrounded by the sliding face S, and within which a bottom portion 11d is recessed from the sliding face S (refer to FIG. 3B). Of the end points of the three edges, A1 is disposed on a circumference with a diameter d1, while B1 and C1 are each located on a circumference with a diameter d6, which is greater than d1. The pair of edges A1-B1 and A1-C1 are disposed on opposite sides of a radial axis R and become farther apart as they extend toward the high-pressure fluid side, such that the interval along the edge B1-C1 on the high-pressure fluid side becomes greater. In the embodiment that is shown in FIG. 2, the edges A1-B1 and A1-C1 are each disposed at an angle θ1 in relation to the radial axis R, such that the dimple 11 is an isosceles triangle that is symmetrical with respect to the radial axis R. The edge B1-C1 that links the end points B1 and C1 on the high-pressure fluid side of the pair of edges A1-B1 and A1-C1 is formed such that its length is not greater than the lengths of the edges A1-B1 and A1-C1. Note that it preferable for the length of the edge B1-C1 to be defined as from 50% to 100% of the lengths of the edges A1-B1 and A1-C1. It is even more preferable for the edge B1-C1 that links the end points B1 and C1 on the high-pressure fluid side of the pair of edges A1-B1 and A1-C1 to be formed such that its length is shorter than the lengths of the edges A1-B1 and A1-C1. In that case, it is preferable for the length of the edge B1-C1 to be set in the range of 50% to 95% of the lengths of the edges A1-B1 and A1-C1.

Figure 3A:
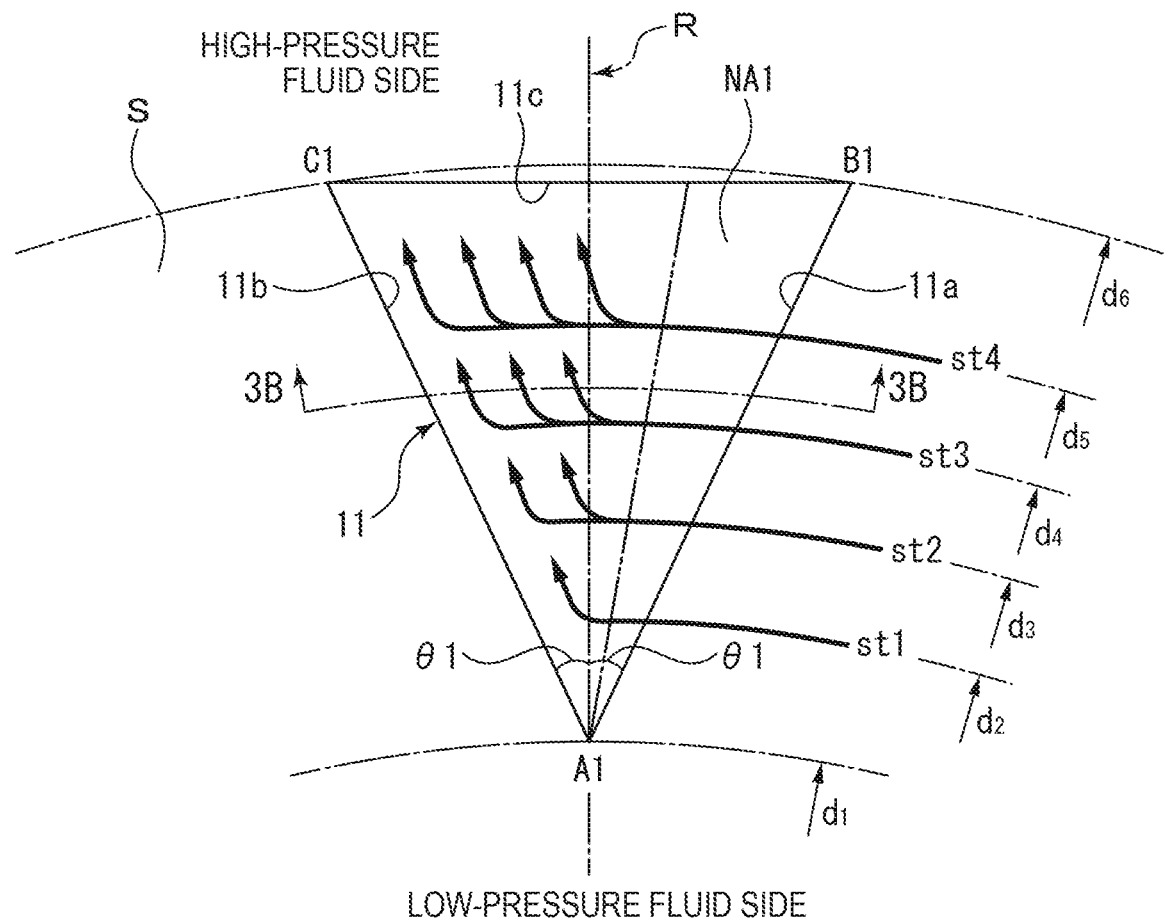
FIG. 3A is figure for explaining the flow of a fluid in the dimple that is formed in the sliding member according to the first embodiment.
Figure 3B:
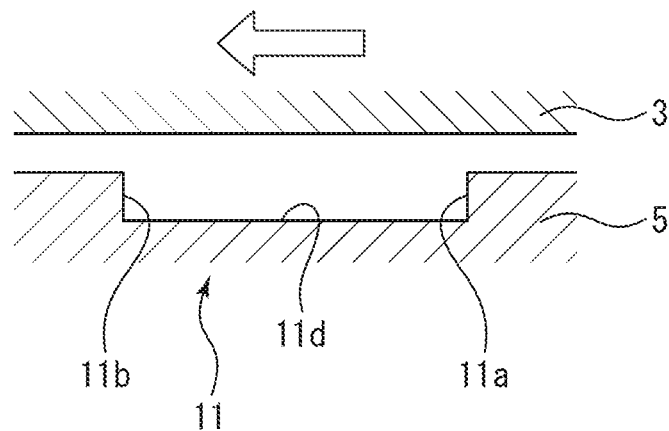
FIG. 3B is a view of the dimple as seen along arrows 3B-3B in FIG. 3A.

The flow of the sealed fluid in a case where the dimples 11 that are formed in this manner are provided on the sliding face will be explained. Using st1, st2, st3, and st4 to represent individual streams, FIG. 3A schematically illustrates the flowing of the sealed fluid into the dimple 11 when the rotating ring 3 rotates counterclockwise in relation to the stationary ring 5, in which a plurality of the dimples 11 are provided. FIG. 3B is a view of the dimple 11 as seen along arrows X-X in FIG. 3A. When the rotating ring 3 moves in relation to the stationary ring 5 in the direction indicated by the arrow (counterclockwise), the fluid that is interposed between the sliding faces of the rotating ring 3 and the stationary ring 5 follows in the same direction that the rotating ring moves, so the fluid flows from the right side (the upstream side) of the dimple 11 toward the left side (the downstream side). A wall portion 11a on the upstream side of the dimple 11 creates a change in level, thereby abruptly enlarging the gap between the rotating ring 3 and the stationary ring 5, such that dynamic pressure (negative pressure) is generated in a region NA1 on the upstream side of the dimple. Conversely, a wall portion 11b on the downstream side of the dimple 11 abruptly shrinks the gap between the rotating ring 3 and the stationary ring 5, such that dynamic pressure (positive pressure) is generated in a region on the downstream side of the dimple.

As shown in FIG. 3A, because the pair of edges A1-B1 and A1-C1, which are disposed on opposite sides of the radial axis R, become farther apart as they extend toward the high-pressure fluid side, such that the interval along the edge B1-C1 on the high-pressure fluid side becomes greater, the cross-sectional area of the dimple 11 gradually widens toward the high-pressure fluid side. Therefore, the fluid that becomes negative in pressure as it flows into the dimple 11 and then becomes positive in pressure as it is blocked by the wall portion 11b is pumped from the end point A1 toward the end point C1 along the wall portion 11b, toward the high-pressure fluid side where the cross-sectional area of the dimple 11 is greater. This causes the stream st1, which has flowed into the dimple 11 along a circumference with the diameter d2 and increased in pressure, to merge with the stream st2, which has flowed into the dimple 11 along a circumference with a diameter d3 and increased in pressure, thus forming a high-pressure stream (st1+st2) that is pumped from the end point A1 toward the end point C1 along the wall portion 11b. Then the stream st3, which has flowed into the dimple 11 along a circumference with a diameter d4 and increased in pressure, merges with the stream (st1+st2) to form a high-pressure stream (st1+st2+st3) that is pumped in a radially outward direction along the wall portion 11b. In the same manner, the stream st4, which has flowed into the dimple 11 along a circumference with a diameter d5 and increased in pressure, merges with the stream (st1+st2+st3) to form a high-pressure stream (st1+st2+st3+st4) that is pumped in the radially outward direction along the wall portion 11b.

In this manner, the fluid that flows into the dimple 11 at the various positions in the radial direction of the sliding face S and becomes negative in pressure is then blocked by the wall portion 11b, increased in pressure to become positive in pressure, and continuously merges with other high-pressure fluids, increasing in volume as it moves from the end point A1 toward the end point C1 along the wall portion 11b. Therefore, the range of the high-pressure fluid gradually expands from the edge A1-C1 (the downstream side) toward the edge A1-B1 (the upstream side). Furthermore, the edge B1-C1 of the dimple 11 serves as the outlet side for the high-pressure fluid, and because it is formed to be shorter than the edge A1-B1, which serves as the inlet side for the fluid, the outlet surface area where the high-pressure fluid flows from the dimple 11 into the gap between the rotating ring 3 and the stationary ring 5 becomes narrower in the circumferential direction. Therefore, the positive pressure region within the dimple 11 expands further by crossing over the radial axis R from the edge A1-C1 (the downstream side) toward the edge A1-B1 (the upstream side). The positive pressure region within the dimple 11 thus becomes greater than the negative pressure region, such that sufficient positive pressure can be generated for the dimple as a whole, regardless of the direction of rotation.

The fluid that has reached high pressure within the dimple 11 is supplied to the sliding face S from the radially outer end of the edge A1-C1 and from the edge B1-C1, making it possible to maintain a state of hydrodynamic lubrication for the sliding face S. The high-pressure fluid that is supplied to the sliding face S from the radially outer end of the edge A1-C1 subsequently flows into the adjacent dimple 11 in the circumferential direction, and the high-pressure fluid that is supplied to the sliding face S from the edge B1-C1 subsequently flows into the adjacent dimple on the radially outward side. It is therefore possible to reduce the flow toward the low-pressure fluid side, so leakage can also be reduced. Because sufficient positive pressure can be generated for the dimple as a whole, regardless of the direction of rotation, and the high-pressure fluid can be supplied to the sliding face S, it is possible to maintain a state of hydrodynamic lubrication for the sliding face S regardless of the direction of rotation. Because the high-pressure fluid that is supplied to the sliding face S subsequently moves toward the radially outward side, either by flowing into the adjacent dimple 11 in the circumferential direction or by flowing into the adjacent dimple in the radially outward direction, it is possible to reduce the flow toward the low-pressure fluid side, so sealing performance can be improved, regardless of the direction of rotation.

Although the first embodiment of the present invention has been described above, a specific configuration thereof is not limited to this embodiment. Any changes and additions made without departing from the scope of the present invention are included in the present invention.

Figure 4:
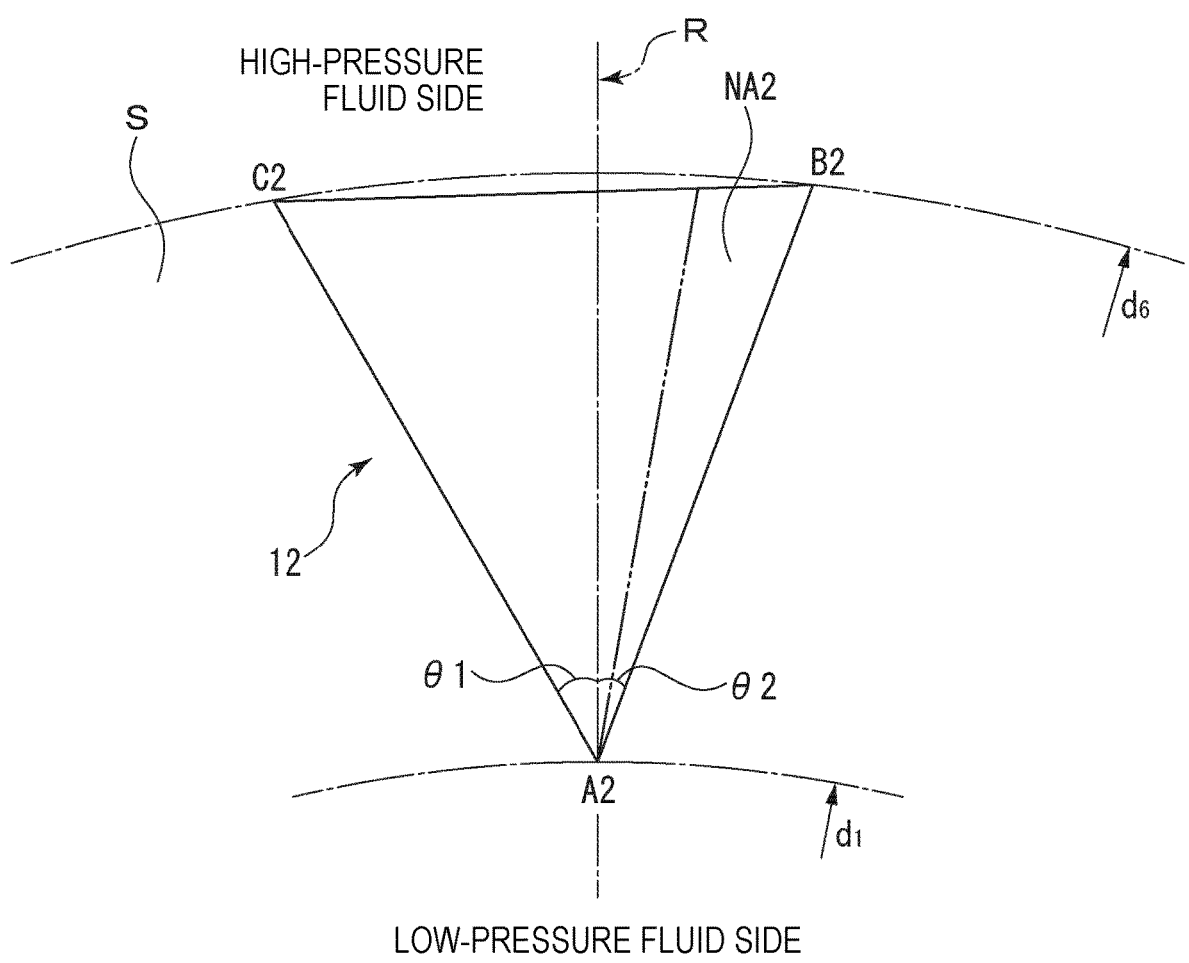
FIG. 4 is a figure showing a modified example of the dimple.

In the embodiment that is described above, the edges A1-B1 and A1-C1 of the dimple 11 are each disposed at an angle θ1 in relation to the radial axis R, such that the dimple 11 is an isosceles triangle that is symmetrical with respect to the radial axis R. However, as shown in FIG. 4, edges A2-B2 and A2-C2 of a dimple 12 may be disposed at different angles θ1, θ2 in relation to the radial axis R. For example, in a case where the rotational direction of the opposite sliding face is mainly counterclockwise, and the frequency of rotation in the clockwise direction is low, the size of a negative pressure region NA2 can be reduced by making the angle θ1 greater than the angle θ2, such that positive pressure will be generated more effectively when rotation is in the counterclockwise direction, which is used more frequently.

Figure 5:
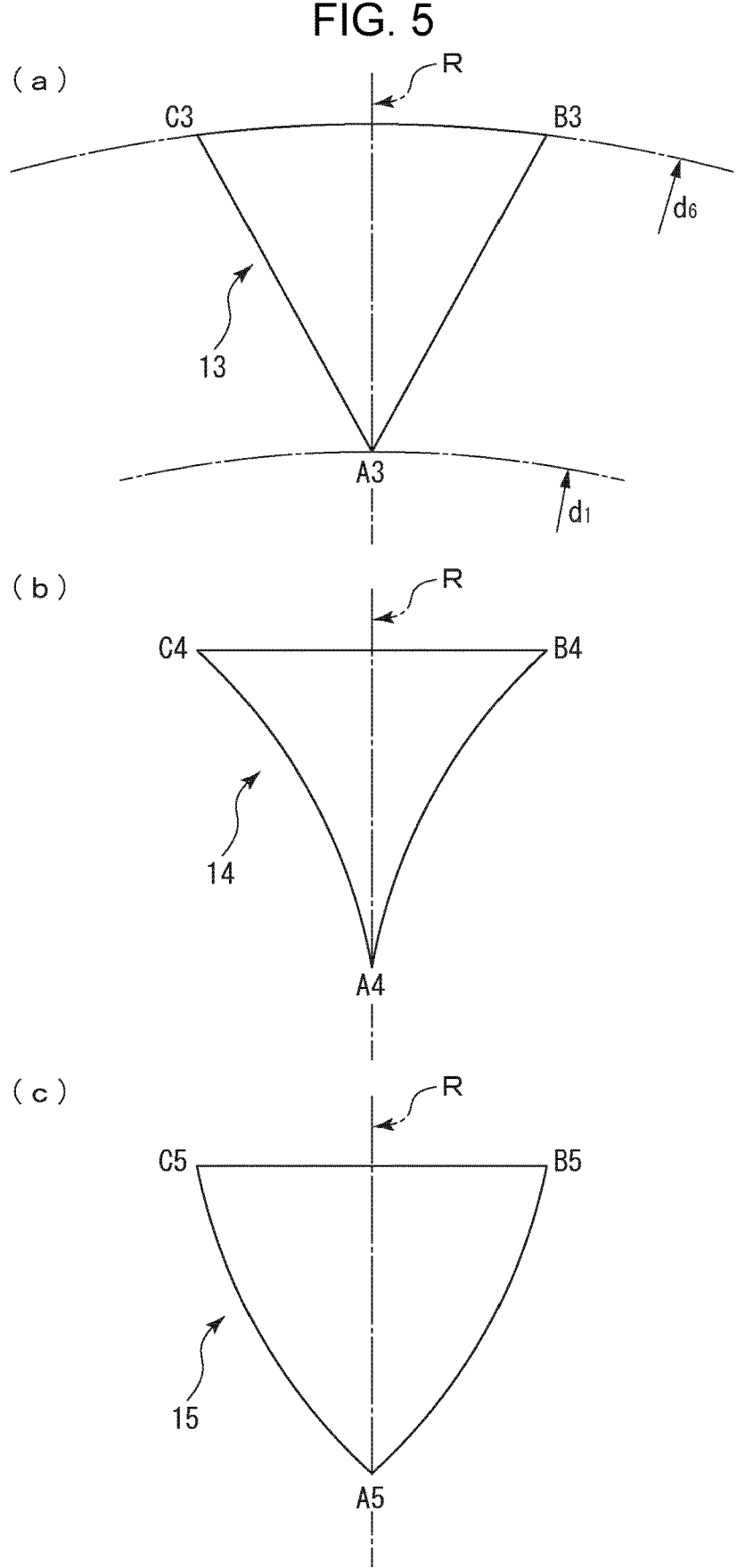
FIG. 5A is a figure showing a modified example of the dimple in which the edge of the dimple that extends in the circumferential direction is configured in an arc shape and the pair of edges that extend in the radial direction are configured as straight lines.
FIG. 5B is a figure showing a modified example of the dimple in which the edge of the dimple that extends in the circumferential direction is configured as a straight line and the pair of edges that extend in the radial direction are configured as curved lines that are bowed toward the inside of the dimple.
FIG. 5C is a figure showing a modified example of the dimple in which the edge of the dimple that extends in the circumferential direction is configured as a straight line and the pair of edges that extend in the radial direction are configured as curved lines that are bowed toward the outside of the dimple.

In the embodiment that is described above, the edges A1-B1, and A1-C1, and B1-C1 of the dimple 11 are configured as straight lines, but the present invention is not limited to this configuration. For example, as shown in FIG. 5A, edges A3-B3 and A3-C3 of a dimple 13 may also be configured as straight lines, while an edge B3-C3 is configured in an arc shape that is centered on an axis of rotation O. As shown in FIG. 5B, an edge B4-C4 of a dimple 14 may also be configured as a straight line that extends in the circumferential direction, while a pair of edges A4-B4 and A4-C4 that extend in the radial direction are configured as curved lines that are bowed toward the inside of the dimple. Finally, as shown in FIG. 5C, an edge B5-C5 of a dimple 15 may also be configured as a straight line that extends in the circumferential direction, while a pair of edges A5-B5 and A5-C5 that extend in the radial direction are configured as curved lines that are bowed toward the outside of the dimple. With these configurations, the pressure at or near the points C3, C4, and C5, each of which is at the radially outer end of the downstream side of the respective dimple, is greatest in FIG. 5B, lower in FIG. 5A, and lower still in FIG. 5C. It is thus possible to generate the necessary positive pressure at the desired position in the dimple in accordance with the sliding speed and the temperature, so good lubrication performance and sealing performance can be demonstrated.

Figure 6:
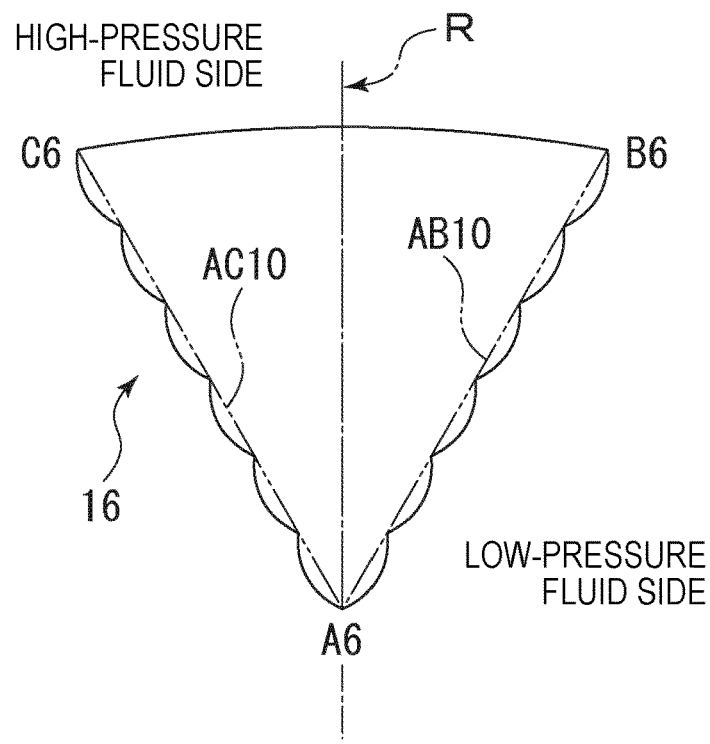
FIG. 6A is a figure showing a modified example of the dimple in which the edge of the dimple that extends in the circumferential direction is configured in an arc shape and the pair of edges that extend in the radial direction are configured as a plurality of curved lines.
FIG. 6B is a figure showing a modified example of the dimple in which the three edges of the dimple are all configured as a plurality of curved lines.
Figure 6:
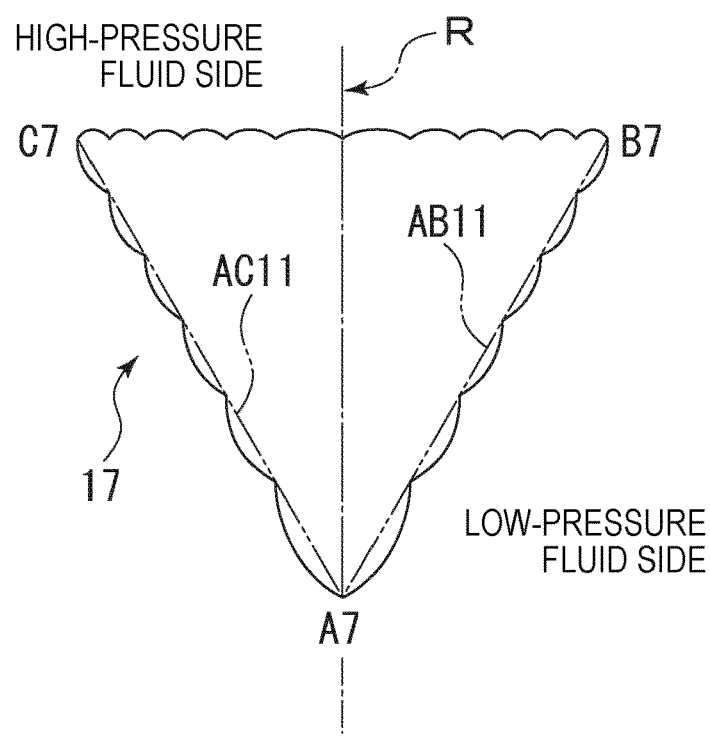

In the embodiment that is described above, the edges A1-B1, and A1-C1, and B1-C1 of the dimple 11 are configured as straight lines, and the edges of the dimples 13, 14, 15 are configured as combinations of single straight lines and single curved lines, but the present invention is not limited to these configurations. For example, as shown in FIG. 6A, an edge B6-C6 of a dimple 16 is configured in an arc shape that is centered on an axis of rotation O, and edges A6-B6, A6-C6 are each configured from a plurality of curved lines. In this case, a line AB10, which connects the end points of the plurality of the curved lines that configure the edge A6-B6 on the inner side of the dimple, a line AC10, which connects the end points of the plurality of the curved lines that configure the edge A6-C6 on the inner side of the dimple, are disposed on opposite sides of the radial axis R and become farther apart as they extend toward the high-pressure fluid side. Furthermore, if the length of the edge B6-C6 is formed such that it is not greater than the combined length of the curved lines on the edge A6-B6 and not greater than the combined length of the curved lines on the edge A6-C6, the positive pressure region within the dimple 16 can be made significantly larger than the negative pressure region, such that sufficient positive pressure can be generated for the dimple as a whole.

In the same manner, as shown in FIG. 6B, three edges A7-B7, A7-C7, and B7-C7 that form a triangle may each be configured from a plurality of curved lines. In this case as well, a line AB11, which connects the end points of the plurality of the curved lines that configure the edge A7-B7 on the inner side of the dimple, a line AC11, which connects the end points of the plurality of the curved lines that configure the edge A7-C7 on the inner side of the dimple, are disposed on opposite sides of the radial axis R and become farther apart as they extend toward the high-pressure fluid side. Furthermore, if the edge B7-C7 is formed such that the total of the lengths of the curved lines on the edge B7-C7 is not greater than the total of the lengths of the curved lines on the edge A7-B7 and not greater than the total of the lengths of the curved lines on the edge A7-C7, the positive pressure region within the dimple 17 can be made significantly larger than the negative pressure region, such that sufficient positive pressure can be generated for the dimple as a whole.

Figure 7:
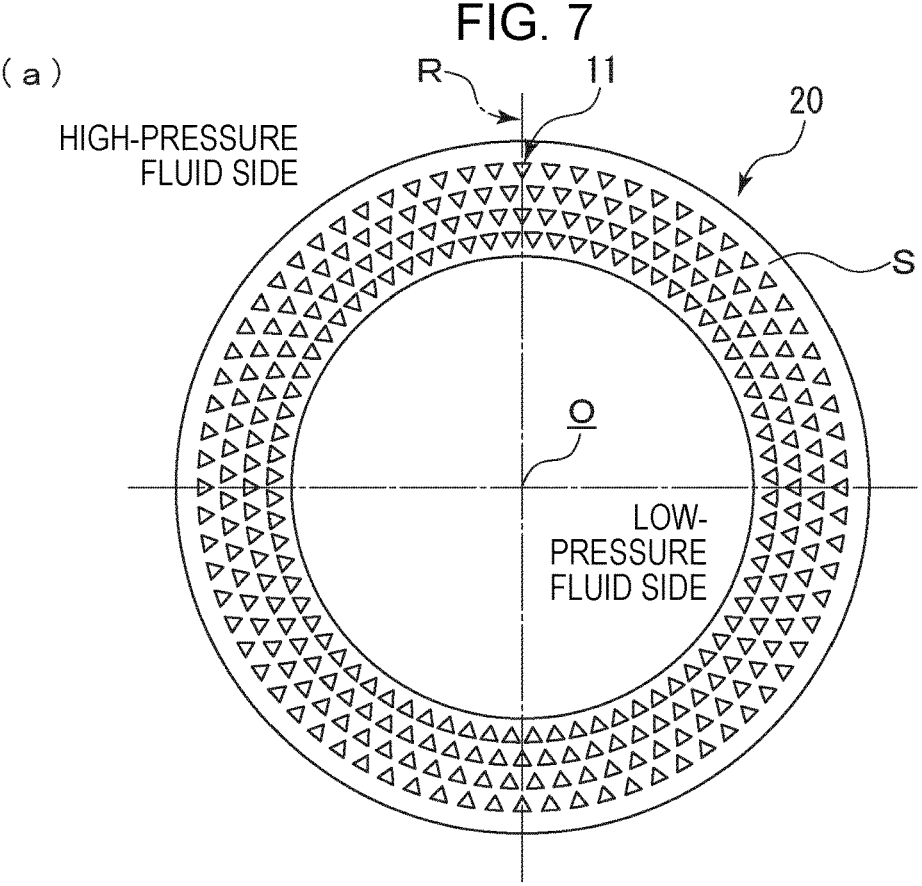
FIG. 7A is a figure showing a modified example of the arrangement of the dimples in which groups of the dimples that are adjacent to one another in the radial direction are offset from one another in the circumferential direction.
FIG. 7B is a figure showing a case in which the radially outer side of the sliding member is a low-pressure fluid side and the radially inner side is a high-pressure fluid side, and in which the dimples that are adjacent to one another in the radial direction are disposed such that they aligned in the radial direction.
Figure 7:
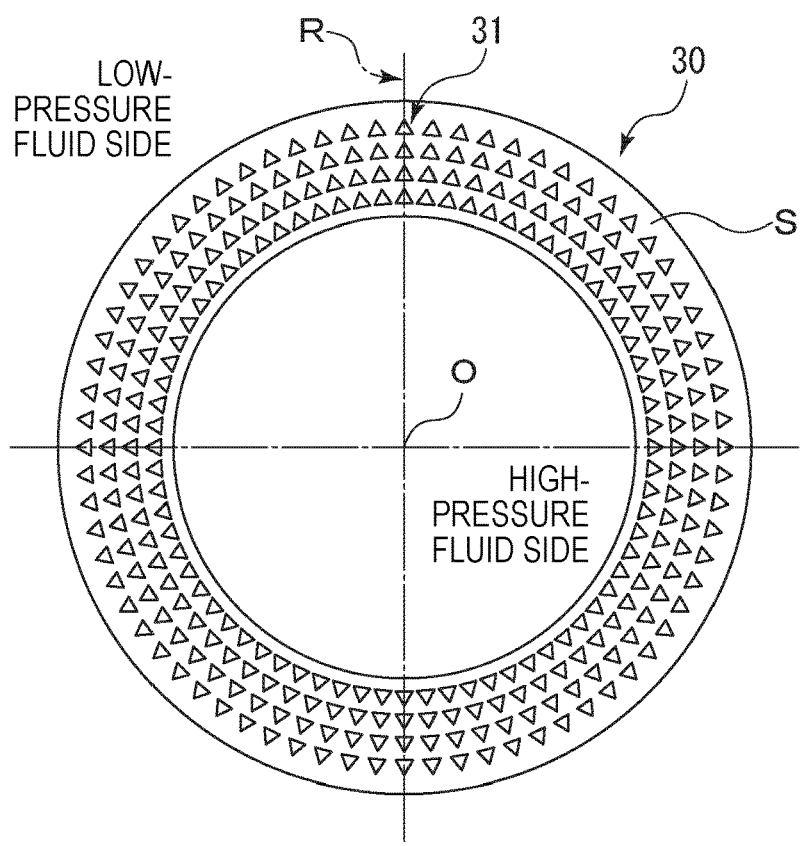

In the embodiment that is described above, the plurality of the dimples 11 that are formed on the stationary ring 5 are arranged in a ring with a specified diameter, and groups of the dimples arranged in the ring are provided in a plurality of rows that are arrayed in the radial direction, but the present invention is not limited to this configuration. For example, as shown in FIG. 7A, a plurality of the dimples 11 that are formed on a stationary ring 20 may be arranged in a ring with a specified diameter, and the groups of the dimples adjacent to one another in the radial direction may be offset from one another in the circumferential direction to be disposed in a staggered arrangement. This configuration causes the flow paths of the fluid that flows over the sliding face S form a zigzag pattern, which can reduce leakage. The dimples may also be arranged randomly, such that the gaps between adjacent dimples do not form a regular pattern in the radial direction and the circumferential direction. This configuration makes it possible for the randomly arranged dimples to demonstrate good lubrication performance and sealing performance in accordance with the sliding speed and the temperature.

In the embodiment that is described above, the plurality of the dimples 11 are formed to have uniform size and depth, but the present invention is not limited to this configuration. For example, in order to provide adaptability to different sliding speeds and different temperatures (different fluid viscosities), one of dimples 11 with different sizes, dimples 11 with different depths, and dimples 11 with different sizes and different depths may be arranged randomly. In a case where the sliding member is used in an environment where the sliding speed and the temperature (the fluid viscosity) change in various ways, a plurality of dimples with different sizes and different depths that are optimized for various environments can achieve better lubrication performance and better sealing performance than a plurality of uniform dimples with equal sizes and equal depths.

Note that, in the embodiment that is described above, it was explained that the outer circumferential side of the stationary ring 5 is the high-pressure fluid side, and the radially inner side is the low-pressure fluid side. However, FIG. 7B shows a case in which the outer circumferential side of a stationary ring 30 is a low-pressure fluid side and the radially inner side is a high-pressure fluid side, and in which dimples 31 that are adjacent to one another in the radial direction are disposed such that they aligned in the radial direction. In this case, the edges of the dimple 31 that are disposed on opposite sides of the radial axis R become farther apart as they extend toward the radially inner side.

Second Embodiment

Figure 8:
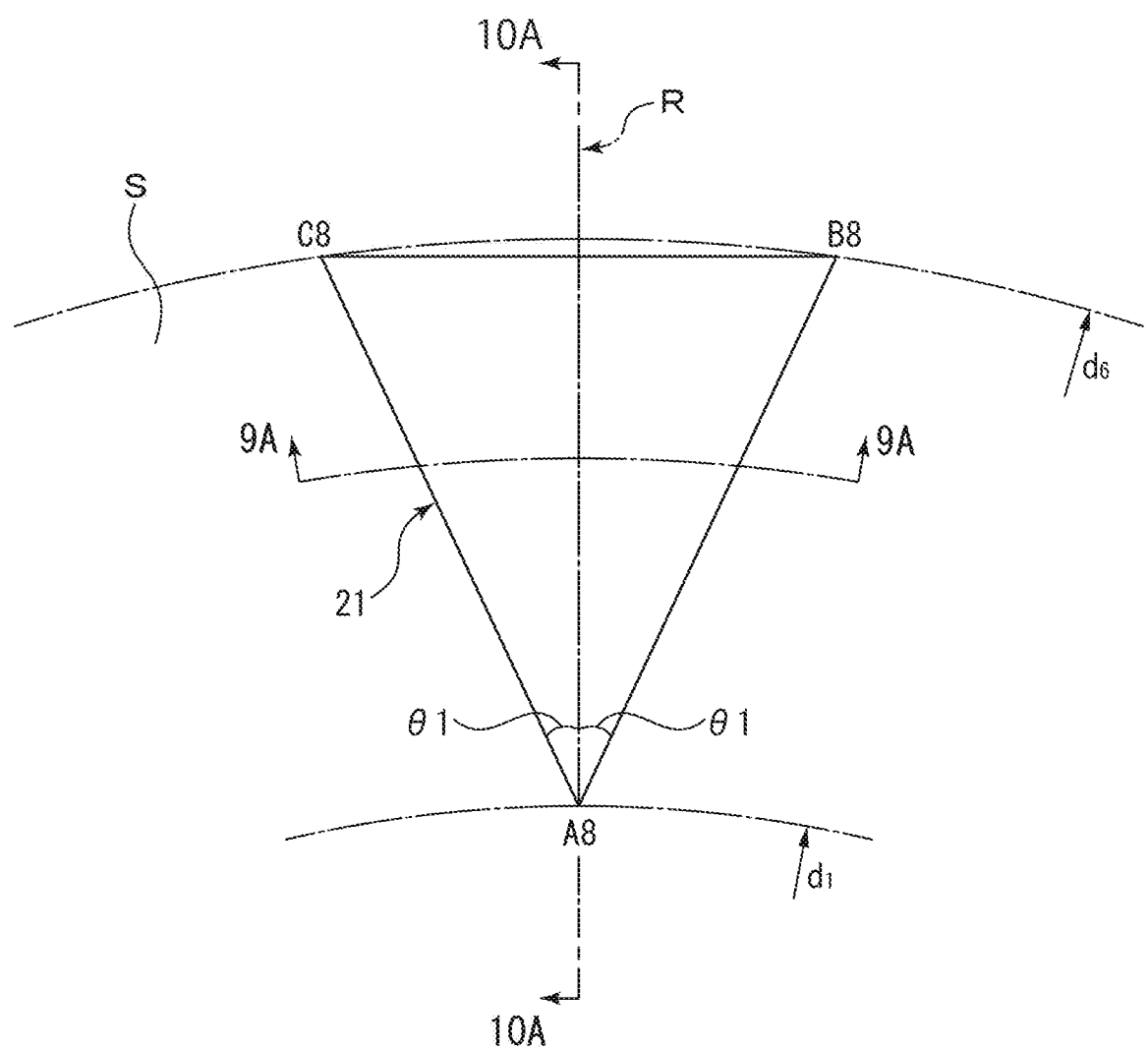
FIG. 8 is a figure showing a dimple according to a second embodiment.

Next, a sliding member according to a second embodiment will be explained with reference to FIGS. 8 to 10. FIG. 8 shows the surface shape of a dimple 21, which is identical to the surface shape of the dimple 11 in the first embodiment. However, in the first embodiment, the bottom portion of the dimple is formed such that it has a uniform depth, while in the second embodiment, the bottom portion of the dimple differs from that in the first embodiment in that it is sloped. Explanations will be omitted for structural elements that are the same as those in the preceding embodiment.

Figure 9:
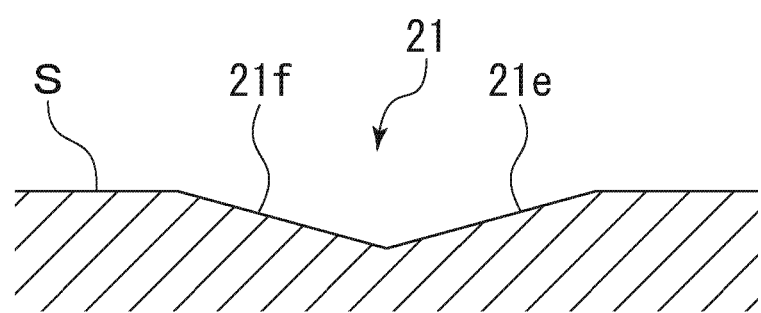
FIG. 9A is a view of the dimple as seen along arrows 9A-9A in FIG. 8, showing a case in which the bottom portion of the dimple slopes downward toward the center of the dimple from the pair of edges that extend in the radial direction.
FIG. 9B is a view of the dimple as seen along the arrows 9A-9A in FIG. 8, showing a case in which the bottom portion of the dimple is formed as a surface that curves downward toward the center of the dimple from the pair of edges that extend in the radial direction.
Figure 9:
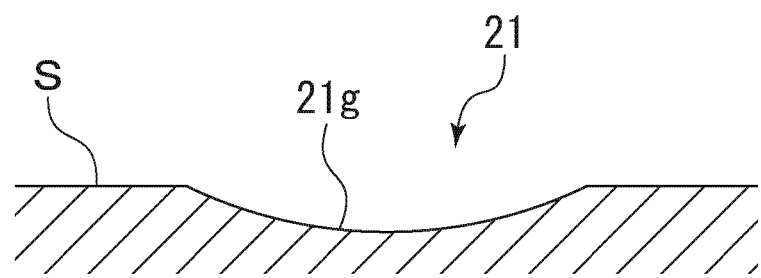

FIG. 9 shows cross sections in the circumferential direction of the dimple 21 as seen along arrows Y-Y in FIG. 8. In FIG. 9A, bottom portions 21e, 21f of the dimple 21 are formed as flat surfaces that respectively slope downward toward the radial axis R from vicinities of edges A8-B8 and A8-C8, which are disposed on opposite sides of the radial axis R. In FIG. 9B, a bottom portion 21g of the dimple 21 are formed as a curved surface that slopes downward toward the radial axis R from the vicinities of the edges A8-B8 and A8-C8, which are disposed on opposite sides of the radial axis R. Forming the bottom portions in these ways makes it possible to mitigate the sudden pressure drop in the fluid that flows from the sliding face S into the dimple 21 on the upstream side and also makes it possible to more efficiently raise the pressure of the fluid that flows back to the sliding face S from inside the dimple 21 on the downstream side.

Figure 10:
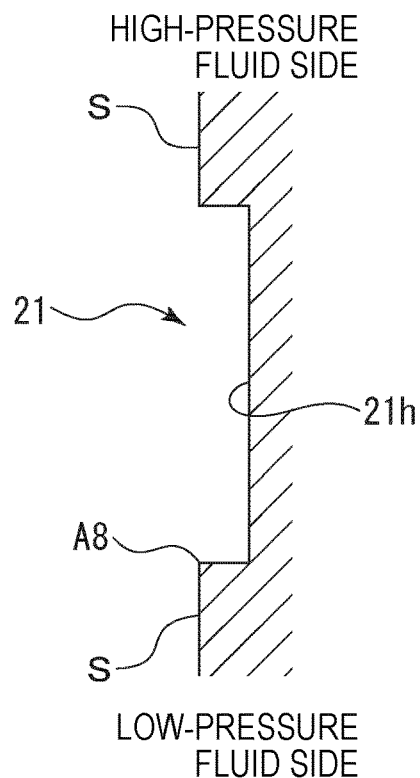
FIG. 10A is a view of the dimple as seen along arrows 10A-10A in FIG. 8, showing a case in which the bottom portion of the dimple is formed as a flat surface with a substantially uniform depth.
FIG. 10B is a view of the dimple as seen along the arrows Z-Z in FIG. 8, showing a case in which the bottom portion of the dimple is formed as a surface that slopes upward from the low-pressure fluid side toward the high-pressure fluid side.
Figure 10:
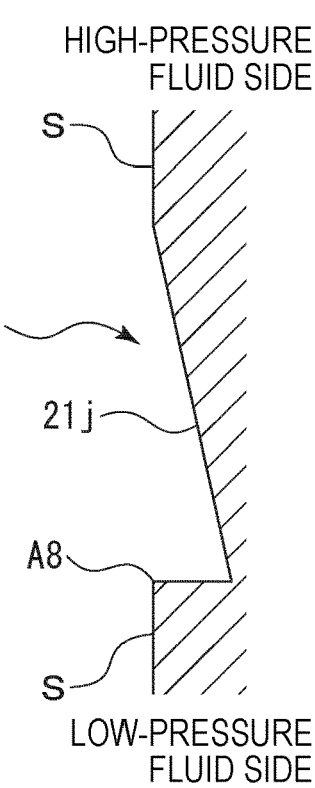

FIG. 10 shows cross sections in the radial direction of the dimple 21 as seen along arrows Z-Z in FIG. 8. The dimple 21 in FIG. 10A has a bottom portion 21h that has a constant depth from the low-pressure fluid side toward the high-pressure fluid side. In contrast, the dimple 21 in FIG. 10B has a bottom portion 21j that slopes upward from the low-pressure fluid side toward the high-pressure fluid side. The pressure of the fluid that flows into the dimple 21 is made negative by a change in level at a wall portion 21a and is then increased to a positive pressure when the fluid is blocked by a wall portion 21b. The pressure is increased even more by the flowing of the fluid over the bottom portion 21j, which slopes upward from the low-pressure fluid side toward the high-pressure fluid side, so the range of the high-pressure fluid is even further enlarged from the edge A8-C8 toward the edge A8-B8. Therefore, the positive pressure region can be enlarged more than in the dimple 21 that has a constant depth, as with the bottom portion 21h, such that sufficient positive pressure can be generated for the dimple as a whole, regardless of the direction of rotation.

Note that the bottom portions 21f and 21g that are shown in FIG. 9 and the bottom portions 21h and 21j that are shown in FIG. 10 may be implemented independently and may also be implemented in combination, such that the bottom portion of the dimple slopes in both the circumferential direction and the radial direction.

Third Embodiment

Next, a sliding member according to a third embodiment will be explained with reference to FIG. 11. In the first embodiment and the second embodiment, the bottom portions of the dimples are formed with flat surfaces, but the third embodiment differs from the first embodiment and the second embodiment in that the bottom portion of the dimple includes continuous grooves. Note that the same reference numerals will be used for structural elements that are the same as those in the preceding embodiments, and explanations of those elements will be omitted.

Figure 11A:
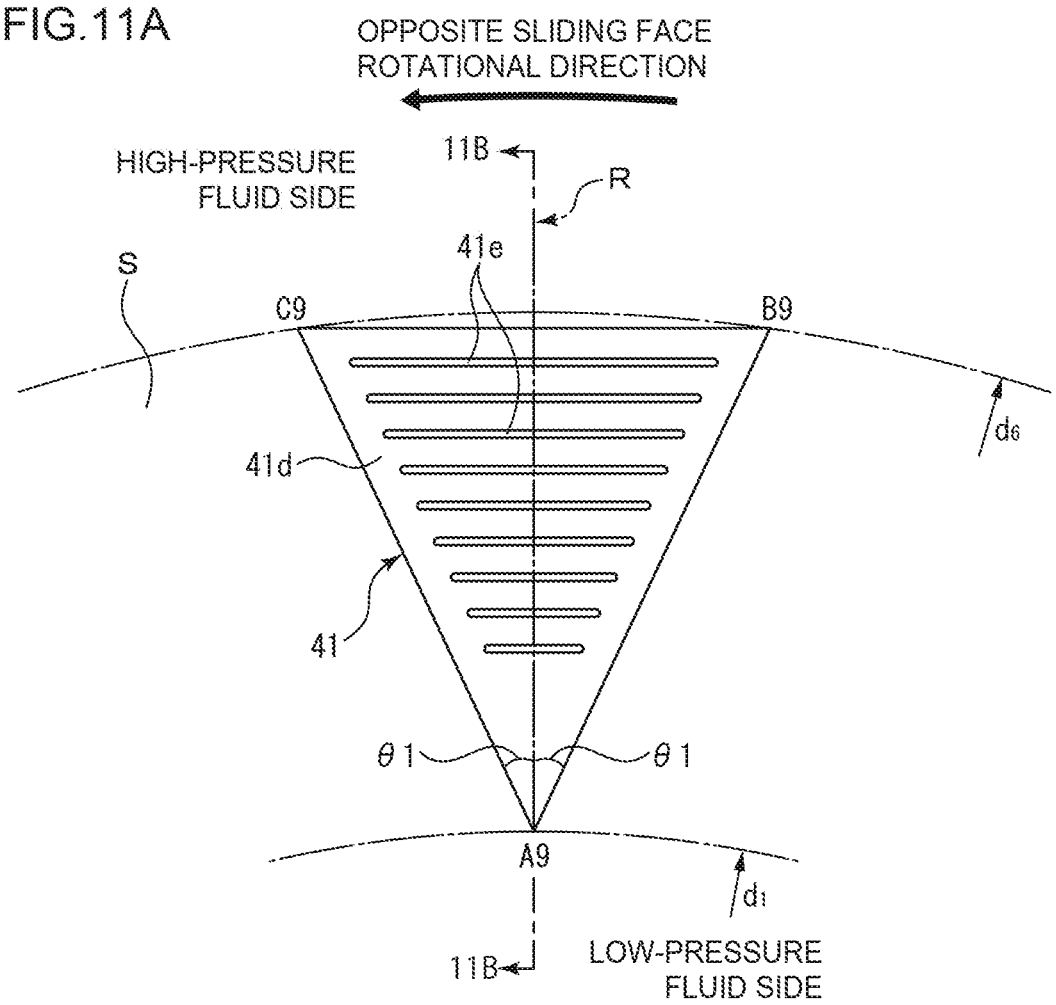
FIG. 11A is a figure showing a dimple according to a third embodiment and the shape of the surface of the dimple.
Figure 11B:
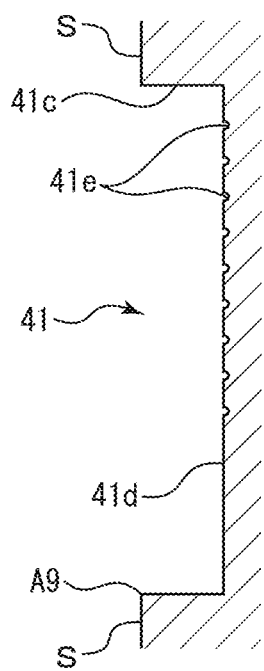
FIG. 11B is a view of the dimple according to the third embodiment, as seen along arrows 11B-11B in FIG. 11A.

As shown in FIG. 11A, continuous grooves 41e are formed in a bottom portion 41d of a dimple 41 that are continuous between vicinities of a pair of edges A9-B9 and A9-C9 that are disposed on opposite sides of the radial axis R. Because high-pressure fluid can be supplied through the continuous grooves 41e that are formed in the bottom portion 41d of the dimple 41 from a positive pressure region on the downstream side of the dimple 41 to a negative pressure region on the upstream side, the negative pressure region within the dimple 41 can be reduced, and sufficient positive pressure can be generated for the dimple as a whole.

It goes without saying that the continuous grooves 41e of the dimple 41 of the third embodiment can also be implemented in combination with the dimples of the first embodiment and the dimple of the second embodiment. In particular, combining the continuous grooves of the dimple 41 of the third embodiment with the sloping bottom portion of the dimple 21 of the second embodiment makes it possible to enhance the effect of enlarging the positive pressure region within the dimple 41, without being affected by the direction of rotation. Note that the depth, the width, the length, and the number of the continuous grooves 41e are determined in accordance with the revolution speed, the sealing pressure, and the type of the sealed fluid. In a case where a large amount of foreign matter is contained in the sealed fluid, it is preferable for the depth and the width of the continuous grooves 41e to be greater.

Fourth Embodiment

Figure 12:
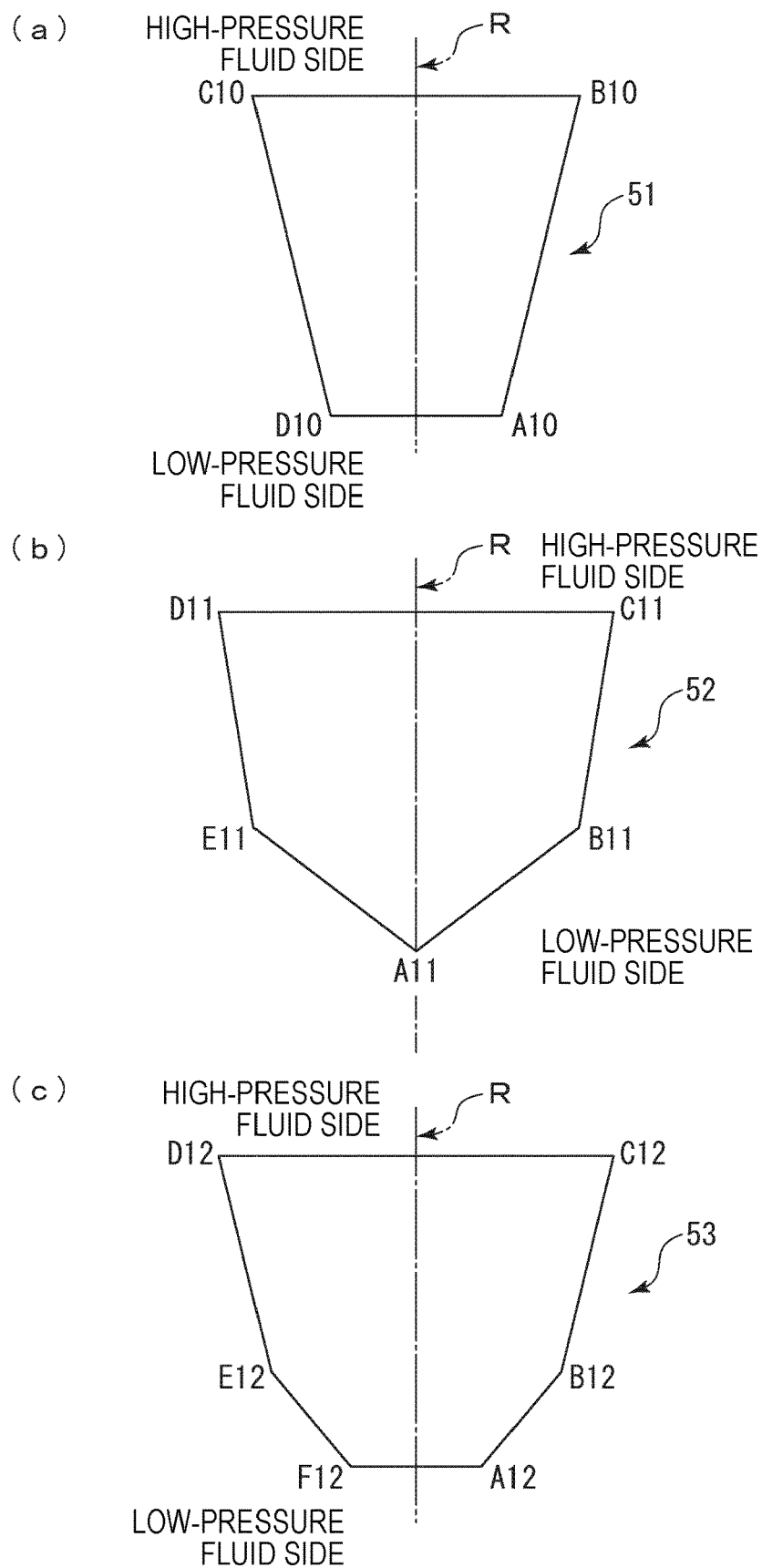
FIG. 12A is a figure showing a dimple according to a fourth embodiment, with the dimple configured as a four-sided shape.
FIG. 12B is a figure showing the dimple according to the fourth embodiment configured as a five-sided shape.
FIG. 12C is a figure showing the dimple according to the fourth embodiment configured as a six-sided shape.

Next, a sliding member according to a fourth embodiment will be explained with reference to FIG. 12. In the first embodiment, the second embodiment, and the third embodiment, the surface shape of the dimple is triangular, but the fourth embodiment differs from the first embodiment, the second embodiment, and the third embodiment in that the dimple of the fourth embodiment has a multi-sided shape with at least four sides. Note that the same reference numerals will be used for structural elements that are the same as those in the preceding embodiments, and explanations of those elements will be omitted.

FIG. 12A shows the embodiment in a case where the surface shape of a dimple 51 is a trapezoid. Among the edges of the dimple that is formed into a trapezoid, a pair of edges A10-B10, D10-C10, which extend in the radial direction on opposite sides of the radial axis R, are sloped to become farther apart as they extend toward the high-pressure fluid side, such that an edge B10-C10 on the high-pressure fluid side is formed to be longer than an edge A10-D10 on the low-pressure fluid side. Furthermore, the length of the edge B10-C10 is formed such that it is not greater than the lengths of the edges A10-B10, D10-C10.

FIG. 12B shows the embodiment in a case where the surface shape of the dimple 52 is a five-sided shape. Among the edges of the dimple that is formed into a five-sided shape, a pair of edges A11-B11-C11, A11-E11-D11, which extend in the radial direction on opposite sides of the radial axis R, are sloped to become farther apart as they extend toward the high-pressure fluid side. Furthermore, the length of an edge C11-D11, which extends in the circumferential direction on the high-pressure fluid side, is formed such that it is not greater than the length of the edge A11-B11-C11 and the length of the edge A11-E11-D11.

FIG. 12C shows the embodiment in a case where the surface shape of a dimple 53 is a six-sided shape. Among the edges of the dimple that is formed into a six-sided shape, a pair of edges A12-B12-C12, F12-E12-D12, which extend in the radial direction on opposite sides of the radial axis R, are sloped to become farther apart as they extend toward the high-pressure fluid side. Furthermore, the length of an edge C12-D12, which extends in the circumferential direction on the high-pressure fluid side, is formed such that it is not greater than the length of the edge A12-B12-C12 and the length of the edge F12-E12-D12.

Configuring the dimple as shown in FIGS. 12A, 12B, and 12C enlarges the positive pressure region within the dimple, making it possible to create a sliding member that can generate sufficient positive pressure for the dimple as a whole, without being affected by the direction of rotation. Note that it goes without saying that a multi-sided dimple having more than five edges can be formed based on the same concept as the dimples in FIGS. 12A, 12B, and 12C. A sliding member can also be made with a combination of triangular dimples and multi-sided dimples having at least four sides.

In the embodiments that are described above, the plurality of the dimples are formed to have identical shapes, but the present invention is not limited to this configuration. For example, in order to provide adaptability to different sliding speeds and different temperatures (different fluid viscosities), dimples with different sizes, depths, and shapes may be arranged randomly. In a case where the sliding member is used in an environment where the sliding speed and the temperature (the fluid viscosity) change in various ways, a plurality of dimples with different sizes, depths, and shapes that are optimized for various environments can achieve better lubrication performance and better sealing performance than a plurality of uniform dimples with identical sizes, depths, and shapes.

In the embodiments that are described above, the dimples are provided in the sliding face of the stationary ring, but they may also be provided in the sliding face of the rotating ring.

In the embodiments that are described above, the sliding member is used as one of a set of a rotating ring and a stationary ring in a mechanical seal unit, but the sliding member can also be used as a sliding member of a bearing that slides on a rotating shaft as it seals a lubricating oil at one end in the axial direction of a cylindrical sliding face.

REFERENCE SIGNS LIST 3 rotating ring
5 stationary ring
11 dimple
11a wall portion
11b wall portion
11c wall portion
12 dimple
13 dimple
14 dimple
15 dimple
16 dimple
17 dimple
20 stationary ring
21 dimple
21a wall portion
21b wall portion
21c wall portion
21e bottom portion
21f bottom portion
21g wall portion
21h bottom portion
21j bottom portion
30 stationary ring
31 dimple
41 dimple
41d bottom portion
41e continuous groove
51 dimple
52 dimple
53 dimple
A1-B1 edge
B1-C1 edge
A1-C1 edge
A2-B2 edge
B2-C2 edge
A2-C2 edge
A3-B3 edge
B3-C3 edge
A3-C3 edge
A4-B4 edge
B4-C4 edge
A4-C4 edge
A5-B5 edge
B5-C5 edge
A5-C5 edge
S sliding face
R radial axis
O axis of rotation

The invention claimed is:

1. A sliding member comprising sliding faces configured to slide in relation to one another, at least one of the sliding faces being provided with a plurality of dimples, each dimple having a bottom portion recessed from the at least one of the sliding faces, and each dimple having a multi-sided shape whose edges are, in their entirety, formed on and surrounded by the at least one of the sliding faces without interruption, wherein
    a pair of the edges of each of the multi-sided dimples, extending radially on opposite sides of a radial axis of the sliding member, are sloped to become farther apart as they extend toward a high-pressure fluid side, and another of the edges, which connects end points on the high-pressure fluid side of the pair of the edges, is formed such that its length is not greater than the lengths of the pair of the edges.

2. The sliding member according to claim 1, wherein the bottom portions of the plurality of dimples have equal depths.

3. The sliding member according to claim 2, wherein the plurality of the dimples have different sizes.

4. The sliding member according to claim 2, wherein the bottom portion of each of the dimples slopes downward toward the radial axis from vicinities of the pair of the edges.

5. The sliding member according to claim 2, wherein the bottom portion of each of the dimples slopes upward from a low-pressure fluid side toward the high-pressure fluid side.

6. The sliding member according to claim 2, wherein the bottom portion of each of the dimples has a continuous groove configured to be continuous between the vicinities of the pair of the edges.

7. The sliding member according to claim 2, wherein each of the dimples is provided with a symmetrical shape in relation to the radial axis.

8. The sliding member according to claim 2, wherein each of the dimples is formed in a three-sided shape.

9. The sliding member according to claim 2, wherein the plurality of the dimples are arranged in a ring with a specified diameter, and a plurality of groups of the dimples arranged in the ring are arrayed radially.

10. The sliding member according to claim 2, wherein the plurality of the dimples are disposed randomly.

11. The sliding member according to claim 1, wherein the bottom portions of the plurality of dimples have different depths.

12. The sliding member according to claim 11, wherein the plurality of the dimples have different sizes.

13. The sliding member according to claim 11, wherein the bottom portion of each of the dimples slopes downward toward the radial axis from vicinities of the pair of the edges.

14. The sliding member according to claim 11, wherein the bottom portion of each of the dimples slopes upward from a low-pressure fluid side toward the high-pressure fluid side.

15. The sliding member according to claim 11, wherein the bottom portion of each of the dimples has a continuous groove configured to be continuous between the vicinities of the pair of the edges.

16. The sliding member according to claim 1, wherein each of the dimples is provided with a symmetrical shape in relation to the radial axis.

17. The sliding member according to claim 1, wherein each of the dimples is formed in a three-sided shape.

18. The sliding member according to claim 1, wherein the plurality of the dimples are arranged in a ring with a specified diameter, and a plurality of groups of the dimples arranged in the ring are arrayed radially.

19. The sliding member according to claim 18, wherein the groups of the dimples that are radially adjacent to one another are circumferentially offset from one another.

20. The sliding member according to claim 1, wherein the plurality of the dimples are disposed randomly.

\* \* \* \* \*